US012559631B2

(12) United States Patent
Roschmann et al.

(10) Patent No.: US 12,559,631 B2
(45) Date of Patent: Feb. 24, 2026

(54) THERMALLY CURABLE TWO-COMPONENT COATING COMPOUNDS

(71) Applicant: BASF SE, Ludwigshafen am Rhein (DE)

(72) Inventors: Konrad Roschmann, Ludwigshafen am Rhein (DE); Wolfgang Paulus, Ludwigshafen am Rhein (DE); Frederic Lucas, Ludwigshafen am Rhein (DE); Susanne Neumann, Ludwigshafen am Rhein (DE); Alexander-Constantin Felix Woerner, Heidenheim (DE)

(73) Assignee: BASF SE, Ludwigshafen am Rhein (DE)

( * ) Notice: Subject to any disclaimer, the term of this patent is extended or adjusted under 35 U.S.C. 154(b) by 862 days.

(21) Appl. No.: 17/765,852

(22) PCT Filed: Oct. 1, 2020

(86) PCT No.: PCT/EP2020/077499
§ 371 (c)(1),
(2) Date: Apr. 1, 2022

(87) PCT Pub. No.: WO2021/069295
PCT Pub. Date: Apr. 15, 2021

(65) Prior Publication Data
US 2022/0325106 A1 Oct. 13, 2022

(30) Foreign Application Priority Data
Oct. 8, 2019 (EP) .................................... 19201855

(51) Int. Cl.
*C09D 4/00* (2006.01)
*C09D 133/08* (2006.01)
(Continued)

(52) U.S. Cl.
CPC ............. *C09D 4/00* (2013.01); *C09D 133/08* (2013.01); *C09D 175/04* (2013.01); *C09D 181/02* (2013.01)

(58) Field of Classification Search
None
See application file for complete search history.

(56) References Cited

U.S. PATENT DOCUMENTS 3,479,310 A    11/1969  Dieterich et al.
4,596,678 A     6/1986  Merger et al.
(Continued)

FOREIGN PATENT DOCUMENTS

DE        4010783 A1    10/1991
DE        4113160 A1    10/1992
(Continued)

OTHER PUBLICATIONS

International Preliminary Report on Patentability received for PCT Patent Application No. PCT/EP2020/077499, mailed on Apr. 21, 2022, 8 pages.
(Continued)

*Primary Examiner* — Anthony J Frost
(74) *Attorney, Agent, or Firm* — Faegre Drinker Biddle & Reath LLP

(57) ABSTRACT

A two-component coating composition comprising
at least one water-dispersible polymer mixture (A) which has at least one
mercapto-reactive group selected from the group of epoxide and Michael acceptor,
and also
at least one water-emulsifiable thiol (B) comprising, as formation components,
   (Ba) at least one compound having at least two mercapto groups,
(Continued)

Formulation stability with respect to aqueous epoxy resin: Waterpoxy 1455 + TMPMP-2a blend (left-hand image, no wall coating) / Waterpoxy 1455 + C-1 blend (right-hand image)

(Bb) at least one compound having at least one mercapto-reactive group and at least one dispersing group, wherein the formation component (Ba) has a Hansch parameter of at least 2.0.

15 Claims, 1 Drawing Sheet

(51) Int. Cl.
    *C09D 175/04*       (2006.01)
    *C09D 181/02*       (2006.01)

(56)         References Cited

U.S. PATENT DOCUMENTS

| 4,596,679 | A | 6/1986 | Hellbach et al. | |
| 5,087,739 | A | 2/1992 | Bohmholdt et al. | |
| 5,473,011 | A | 12/1995 | Laas et al. | |
| 6,551,710 | B1 | 4/2003 | Chen et al. | |
| 2003/0165701 | A1 | 9/2003 | Straw | |
| 2008/0103281 | A1 | 5/2008 | Harvey et al. | |
| 2019/0077965 | A1* | 3/2019 | Bailey | C09D 4/06 |
| 2019/0263941 | A1* | 8/2019 | Gaschler | C08F 2/22 |

FOREIGN PATENT DOCUMENTS

| DE | 19618720 | A1 | 11/1996 | |
| DE | 19724199 | A1 | 12/1998 | |
| DE | 19826712 | A1 | 12/1999 | |
| DE | 19913353 | A1 | 9/2000 | |
| DE | 19957900 | A1 | 6/2001 | |
| DE | 10013186 | A1 | 9/2001 | |
| DE | 10013187 | A1 | 10/2001 | |
| EP | 0057474 | A2 | 8/1982 | |
| EP | 0126299 | A1 | 11/1984 | |
| EP | 0126300 | A1 | 11/1984 | |
| EP | 0355443 | A2 | 2/1990 | |
| EP | 0495751 | A1 | 7/1992 | |
| EP | 0548669 | A2 | 6/1993 | |
| EP | 0615980 | A2 | 9/1994 | |
| EP | 0703255 | A1 | 3/1996 | |
| WO | 98/33761 | A1 | 8/1998 | |
| WO | 00/39183 | A1 | 7/2000 | |
| WO | 2013/139602 | A1 | 9/2013 | |
| WO | 2017/157711 | A1 | 9/2017 | |
| WO | WO-2018015169 | A1 * | 1/2018 | C08F 2/22 |

OTHER PUBLICATIONS

Mishra., et al., "High-performance waterborne UV-curable polyurethane dispersion based on thiol-acrylate/thiol-epoxy hybrid networks", Journal of Coatings Technology and Research, vol. 14, No. 5, 2017, pp. 1069-1081.

O'Brien, et al., "Oxygen inhibition in thiol-acrylate photopolymerizations", Journal of Polymer Science Part A: Polymer Chemistry, vol. 44, No. 6, 2006, pp. 2007-2014.

Otts, et al., "Novel waterborne UV-crosslinkable thiol-ene polyurethane dispersions: Synthesis and film formation", Polymer, vol. 46, No. 19, 2005, pp. 8162-8168.

Xia et al., "Preparation and Characterization of Fluorinated Hydrophobic UV-Crosslinkable Thiol-Ene Polyurethane Coatings" Coatings, vol. 7, No. 8, pp. 117.

International Search Report and Written Opinion received for PCT Patent Application No. PCT/EP2020/077499, mailed on Jan. 18, 2021, 12 pages (6 pages of English Translation and 6 pages of Original Document).

* cited by examiner

Formulation stability with respect to aqueous epoxy resin: Waterpoxy 1455 + TMPMP-2a blend (left-hand image, no wall coating) / Waterpoxy 1455 + C-1 blend (right-hand image)
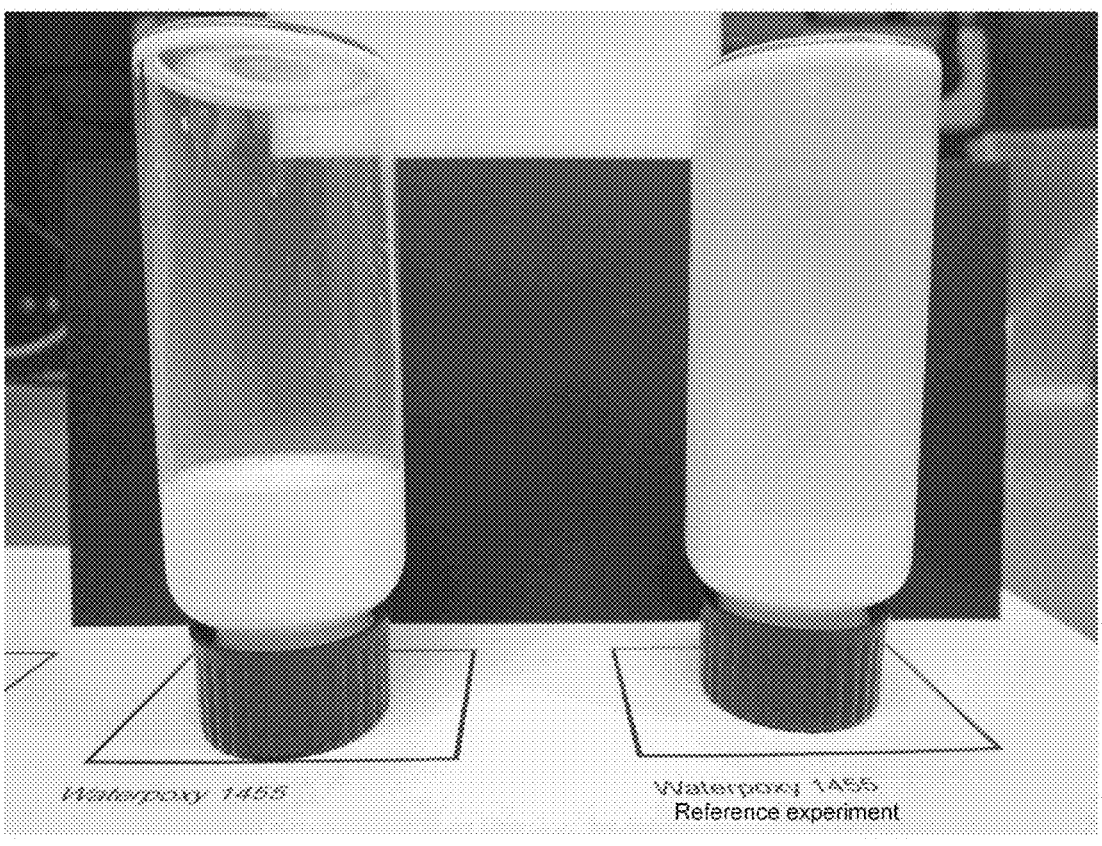

THERMALLY CURABLE TWO-COMPONENT COATING COMPOUNDS

CROSS-REFERENCE TO RELATED APPLICATIONS

This application is a national stage application (under 35 U.S.C. § 371) of PCT/EP2020/077499, filed Oct. 1, 2020, which claims benefit of European Application No. 19201855.4, filed Oct. 8, 2019, both of which are incorporated herein by reference in their entirety.

The invention relates to water-based, thermally curable two-component coating compositions having mercapto groups, to processes for preparing same and to the use thereof.

U.S. Pat. No. 6,551,710 B1 discloses allowing radiation-curable C═C-functional resins (inter alia also acrylates) to react with compounds comprising thio groups. A disadvantage of these systems is that the coating compositions are applied from solvents and thus have a high content of climate-damaging, volatile organic compounds (=VOCs).

A. K. O'Brian, N. B. Cramer, C. N. Bowman describe, in "Oxygen inhibition in Thiol-Acrylate Photopolymerizations", J. Polym. Sci., Part A: Polymer Chemistry 44: 2007-2014 (2006), the influence of the presence of oxygen (O₂) on the copolymerization of acrylates with thiols in substance. At the same concentration of thiol functionalities, higher-functionality thiols lead to faster polymerization, which makes them even more difficult to stabilize.

Solvent-based coating compositions can be substituted by the use of water-dispersible resins as environmentally friendly alternative. This has been described by D. B. Otts, E. Heidenreich and M. W. Urban in "Novel waterborne UV-crosslinkable thiol-ene polyurethane dispersions", Polymer 46: 8162-8168 (2005) and also by V. Mishra, J. Desai and K. I. Patel in "High-performance waterborne UV-curable polyurethane dispersion based on thiol-acrylate/thiol-epoxy hybrid networks", J. Coat. Technol. Res. 14 (5): 1069-1081 (2017) and has also already been realized for C═C-functional and/or epoxy-functional polyurethane dispersions in combination with higher-functionality thiols.

However, the hydrophobic thiol component was added in substance, meaning that it cannot be excluded that significant proportions thereof diffuse into the polyurethane particles and there enter into premature reaction with the co-reactive groups present there (=precuring), which would severely restrict the practical applicability due to excessively short pot lives.

The same also applies accordingly to US 2003/0165701, which describes aqueous coating compositions which comprise a Michael acceptor—namely methylenemalonate—and polythiol as Michael donor. In the examples, the hydrophobic thiol component is added either in substance as described above or as an O/W emulsion stabilized with an external emulsifier (without giving details). However, the selection of suitable emulsifiers is difficult and thus in most cases unstable, phase-separating O/W emulsions are to be expected; in practice therefore the same problem is encountered as for the addition of thiol in substance.

The water-soluble polythiols based on ethoxylated polyalcohols likewise described in US 2003/0165701 lead, as stated in WO 2013/139602, to unstable blends having insufficient pot life, which gel after just a few hours. In contrast, WO 2013/139602 teaches the use of SH-functional polyurethane dispersions: These are present in the aqueous formulation in a manner separated from the co-reactive urethane acrylate particles spatially by water as continuous phase; the crosslinking reaction as a result can only take place during or after film formation. However, from a performance viewpoint it is disadvantageous that such coatings are relatively hard and lack a certain flexibility/elasticity.

An object of the present invention was therefore that of providing water-based two-component coating compositions which are thermally curable by reaction of the mercapto groups present and which have a sufficiently long pot life. The coatings obtained with these formulations are intended to have a moderate hardness with at the same time good flexibility and a high chemical resistance (=crosslinking density).

The object was achieved by a two-component coating composition comprising at least one water-dispersible polymer mixture (A) which has at least one mercapto-reactive group selected from the group of epoxide and Michael acceptor, and also at least one water-emulsifiable thiol (B) comprising, as formation components, (Ba) at least one compound having at least two mercapto groups, (Bb) at least one compound having at least one unsaturated mercapto-reactive group and at least one dispersing group, wherein the formation component (Ba) has a Hansch parameter of at least 2.0.

BRIEF DESCRIPTION OF THE DRAWINGS

FIG. 1 shows the formulation stability with respect to aqueous epoxy resin.

Water-Dispersible Polymer Mixture (A)

The water-dispersible polymer mixture (A) comprises at least one water-dispersible polymer (A1).

Water-dispersible polymers (A1) generally have number-average molecular weights in the range >500 and ≤500 000 g/mol, advantageously ≥600 and ≤10 000 g/mol and particularly advantageously ≥750 and ≤3000 g/mol. In the context of the present invention, the number-average molecular weight should be determined here by gel permeation chromatography using defined polystyrene standards.

In the context of the present invention, useful water-dispersible polymers (A1) are all naturally occurring or synthetically produced polymers having at least one glycidyl, maleimide, fumarate, maleate, acrylate, itaconate, acrylamide, methylenemalonate, crotonate, cinnamate, methacrylamide and/or methacrylate group.

Examples of water-dispersible polymers (A1) based on natural substances include appropriately functionalized (ur) alkyd resins, fatty acid-based polyurethanes, alkoxylated glycerol and epoxy resins or epoxy acrylates based on natural glycerol.

Synthetically produced water-dispersible polymers (A1) include, for example, appropriately functionalized polycondensation products, such as for example alkyd resins, polyesters, polyethers, polycarbonates, polyamides, silicone resins and/or epoxy resins, and polyaddition products such as for example polyurethanes and polymers which are composed of ethylenically unsaturated compounds in polymerized form.

Preferred water-dispersible polymers (A1) are polyurethane acrylates, polyester acrylates, polyether acrylates, epoxy acrylates, multifunctional acrylate polymers and glycidyl ether-functional epoxy resins.

Epoxy resins are for example described in H. Q. Pham, M. J. Marks "Epoxy Resins", DOI: 10.1002/14356007. a09_547. pub2 in "Ullmann's Encyclopedia of Industrial Chemistry—7th ed.", Whurr Publishers, in Z. W. Wicks, F. N. Jones, S. P. Pappas "Organic Coatings: Science and Technology", vol. I, chapter XI "Epoxy and Phenolic Resins", John Wiley & Sons, and in G. Bianchini, R. Dyer, A. Fream, P. Heffer, S. P. McOwan, P. Oldring, I. Royston, N. Tuck, "Waterborne & Solvent Based Epoxies and their End User Applications" in "Waterborne & Solvent Based Surface Coatings Resins and Their Applications", Vol. II, SITA Technology.

These polycondensation compounds and polyaddition compounds are prepared by preparation processes familiar to those skilled in the art.

The water-dispersible polymers (A1) are also advantageously prepared from the corresponding polymeric precursors having at least one glycidyl, maleimide, fumarate, maleate, acrylate, itaconate, acrylamide, methylenemalonate, crotonate, cinnamate, methacrylamide and/or methacrylate group, preferably at least one acrylate and/or methacrylate group.

The water-dispersible polymers (A1) can be prepared under reaction conditions in substance or advantageously in the presence of an inert organic solvent familiar to those skilled in the art. Examples of such organic solvents used are polar, aprotic organic solvents such as for example N-methylpyrrolidone (NMP), N-ethylpyrrolidone (NEP) or dipropylene glycol dimethyl ether (Proglyde® DMM), preferably, however, those having a boiling point in the range ≥40 and ≤170° C. and advantageously in the range ≥60 and ≤130° C., at atmospheric pressure (1.013 bar absolute), such as in particular ketones such as acetone, methyl ethyl ketone, methyl isobutyl ketone, methyl tert-butyl ketone and/or alkyl alkanoates such as ethyl acetate, n-propyl acetate, isopropyl acetate, n-butyl acetate, tert-butyl acetate, methyl propionate or ethyl propionate.

In an advantageous embodiment, after the preparation of the water-dispersible polymers (A1), the organic solvent is replaced by water in a manner familiar to those skilled in the art (addition of water and removal of the organic solvent by distillation), to form an aqueous dispersion of the at least one water-dispersible polymer (A1).

The water-dispersible polymers (A1) do not necessarily have to be hydrophilically modified, but instead may also be converted into a water-dispersed state after addition of surface-active substances (e.g. emulsifiers) by appropriate input of energy or phase inversion or after blending by co-dispersion with a water-dispersible polymer.

Examples of water-dispersible polymers (A1) are described, for example, in P. K. T. Oldring, Chemistry & Technology of UV & EB Formulation for Coatings, Inks & Paints, vol. II: Prepolymers & Reactive Diluents, J. Wiley and Sons, New York and Sita Technology Ltd., London 1997, or in H. Kittel, Lehrbuch der Lacke und Beschichtungen [Textbook of Paints and Coatings], vol. VII: Verarbeitung von Lacken und Beschichtungsmaterialien [Processing of Paints and Coating Materials], pp 240-245 etc., Verlag W. A. Colomb, Berlin 1979.

Suitable polymers (A1) are aliphatic and aromatic epoxy acrylates and epoxy methacrylates, with preference being given to using aliphatic compounds. These include, for example, the reaction products of acrylic acid or methacrylic acid with aliphatic glycidyl ethers.

Further suitable compounds are polyether acrylates and methacrylates, polyester acrylates and methacrylates, and polyurethane acrylates and methacrylates. Among these, preference is given to reaction products of acrylic acid or methacrylic acid with the polyesterols and polyetherols which have been described as polycondensates. Polyetherols that are used in this context are preferably alkoxylated, especially ethoxylated and/or propoxylated, mono-, di-, tri- or polyfunctional alcohols.

The water-dispersible polymer (A1) is preferably a polyurethane comprising, as formation components, (Aa) at least one organic aliphatic, aromatic or cycloaliphatic di- or polyisocyanate, (Ab) at least one compound having at least one isocyanate-reactive group and at least one maleimide, fumarate, maleate, acrylate, acrylamide, acrylonitrile, crotonate, cinnamate, methacrylamide and/or methacrylate group, (Ac) optionally at least one compound having at least two isocyanate-reactive groups, (Ae) optionally at least one compound having exactly one isocyanate-reactive group, (Ag) at least one compound having at least one isocyanate-reactive group and at least one dispersing group.

The reaction mixtures obtained when preparing the polyurethanes of the invention generally have a number-average molar weight $M_n$ of less than 10 000 g/mol, preferably of less than 5000 g/mol, particularly preferably of less than 4000, and very particularly preferably of less than 2000 g/mol (determined by gel permeation chromatography using tetrahydrofuran and polystyrene as standard).

Component (Aa) may be monomers or oligomers of aliphatic or cycloaliphatic diisocyanates.

The NCO functionality of such a compound is generally at least 1.8 and may be up to 8, preferably 1.8 to 5, and particularly preferably 2 to 4.

The diisocyanates are preferably isocyanates having 4 to 20 carbon atoms. Examples of typical diisocyanates are aliphatic diisocyanates such as tetramethylene diisocyanate, pentamethylene 1,5-diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate, trimethylhexane diisocyanate or tetramethylhexane diisocyanate, cycloaliphatic diisocyanates such as 1,4-, 1,3- or 1,2-diisocyanatocyclohexane, 4,4'- or 2,4'-di(isocyanatocyclohexyl)methane, 1-isocyanato-3,3,5-trimethyl-5-(isocyanatomethyl)cyclohexane (isophorone diisocyanate), 1,3- or 1,4-bis(isocyanatomethyl)cyclohexane or 2,4- or 2,6-diisocyanato-1-methylcyclohexane, and also 3(or 4),8(or 9)-bis(isocyanatomethyl)tricyclo[5.2.1.0²,⁶]decane isomer mixtures.

Mixtures of the mentioned diisocyanates may also be present.

Particular preference is given to hexamethylene diisocyanate, 1,3-bis(isocyanatomethyl)cyclohexane, isophorone diisocyanate, and 4,4'- or 2,4'-di(isocyanatocyclohexyl) methane, very particular preference to isophorone diisocyanate and hexamethylene diisocyanate, and especial preference to hexamethylene diisocyanate.

Isophorone diisocyanate is usually in the form of a mixture, specifically a mixture of the cis and trans isomers, generally in a proportion of approx. 60:40 to 80:20 (w/w), preferably in a proportion of about 70:30 to 75:25, and particularly preferably in a proportion of approx. 75:25.

Dicyclohexylmethane 4,4'-diisocyanate may likewise be in the form of a mixture of the different cis and trans isomers.

Cycloaliphatic isocyanates are those which comprise at least one cycloaliphatic ring system.

Aliphatic isocyanates are those which comprise exclusively linear or branched chains, in other words acyclic compounds.

Also suitable are higher isocyanates having an average of more than 2 isocyanate groups. Suitable examples for this purpose are triisocyanates such as triisocyanatononane or 2,4,6-triisocyanatotoluene.

Useful polyisocyanates include polyisocyanates having isocyanurate groups, uretdione diisocyanates, polyisocyanates having biuret groups, polyisocyanates having urethane groups or allophanate groups, polyisocyanates comprising oxadiazinetrione groups, uretonimine-modified polyisocyanates, carbodiimide, hyperbranched polyisocyanates, polyurethane-polyisocyanate prepolymers or polyurea-polyisocyanate prepolymers of linear or branched $C_4$-$C_{20}$ alkylene diisocyanates, cycloaliphatic diisocyanates having a total of 6 to 20 carbon atoms, or mixtures thereof.

The di- and polyisocyanates which can be used preferably have a content of isocyanate groups (calculated as NCO, molecular weight=42) of from 10% to 60% by weight, based on the di- and polyisocyanate (mixture), preferably 15% to 60% by weight and particularly preferably 20% to 55% by weight.

Preference is given to aliphatic and/or cycloaliphatic di- and polyisocyanates, referred to collectively as (cyclo)aliphatic in the context of this specification, examples being the aliphatic and/or cycloaliphatic diisocyanates stated above, or mixtures thereof.

For the present invention it is possible to use not only those di- and polyisocyanates obtained by phosgenating the corresponding amines but also those prepared without the use of phosgene, i.e., by phosgene-free processes. According to EP-A-0 126 299 (U.S. Pat. No. 4,596,678), EP-A-126 300 (U.S. Pat. No. 4,596,679), and EP-A-355 443 (U.S. Pat. No. 5,087,739), for example, (cyclo)aliphatic diisocyanates, such as for example hexamethylene 1,6-diisocyanate (HDI), isomeric aliphatic diisocyanates having 6 carbon atoms in the alkylene radical, 4,4'- or 2,4'-di(isocyanatocyclohexyl)methane, and 1-isocyanato-3-isocyanatomethyl-3,5,5-trimethylcyclohexane (isophorone diisocyanate or IPDI), can be prepared by reacting the (cyclo)aliphatic diamines with, for example, urea and alcohols to give (cyclo)aliphatic biscarbamic esters and subjecting said esters to thermal cleavage into the corresponding diisocyanates and alcohols. The synthesis is usually effected continuously in a circulation process and optionally in the presence of N-unsubstituted carbamic esters, dialkyl carbonates, and other by-products recycled from the reaction process. Di- or polyisocyanates obtained in this way generally comprise a very low or even unmeasurable fraction of chlorinated compounds, leading to favorable color numbers in the products.

In one embodiment of the present invention, the di- and polyisocyanates (Aa) have a total hydrolyzable chlorine content of less than 200 ppm, preferably of less than 120 ppm, particularly preferably less than 80 ppm, very particularly preferably less than 50 ppm, in particular less than 15 ppm, and especially less than 10 ppm. This can be measured, for example, by ASTM method D4663-98. It is of course also possible to use di- and polyisocyanates (Aa) having a higher chlorine content.

The di- and polyisocyanates (Aa) may also be at least partly in blocked form.

Further preference is given to

1) Polyisocyanates having isocyanurate groups and derived from aliphatic and/or cycloaliphatic diisocyanates. Particular preference is given in this context to the corresponding aliphatic and/or cycloaliphatic isocyanatoisocyanurates and in particular to those based on hexamethylene diisocyanate and isophorone diisocyanate. These present isocyanurates are, in particular, trisisocyanatoalkyl and/or trisisocyanatocycloalkyl isocyanurates, which are cyclic trimers of the diisocyanates, or are mixtures with their higher homologs having more than one isocyanurate ring. The isocyanatoisocyanurates generally have an NCO content of 10% to 30% by weight, in particular 15% to 25% by weight, and an average NCO functionality of 2.6 to 8.

2) Uretdione diisocyanates with aliphatically and/or cycloaliphatically attached isocyanate groups, preferably aliphatically and/or cycloaliphatically attached, and in particular those derived from hexamethylene diisocyanate or isophorone diisocyanate. Uretdione diisocyanates are cyclic dimerization products of diisocyanates. The uretdione diisocyanates can be used as a sole component or in a mixture with other polyisocyanates, particularly those specified under 1).

3) Polyisocyanates having biuret groups and having cycloaliphatically or aliphatically attached, preferably cycloaliphatically or aliphatically attached, isocyanate groups, especially tris(6-isocyanatohexyl)biuret or mixtures thereof with higher homologs thereof. These polyisocyanates having biuret groups generally have an NCO content of 18% to 22% by weight and an average NCO functionality of 2.8 to 4.5.

4) Polyisocyanates having urethane and/or allophanate groups and having aliphatically or cycloaliphatically attached, preferably aliphatically or cycloaliphatically attached, isocyanate groups, such as may be obtained, for example, by reacting excess amounts of hexamethylene diisocyanate or of isophorone diisocyanate with mono- or polyhydric alcohols, for example methanol, ethanol, isopropanol, n-propanol, n-butanol, isobutanol, sec-butanol, tert-butanol, n-hexanol, n-heptanol, n-octanol, n-decanol, n-dodecanol (lauryl alcohol), 2-ethylhexanol, n-pentanol, stearyl alcohol, cetyl alcohol, lauryl alcohol, ethylene glycol monomethyl ether, ethylene glycol monoethyl ether, propane-1,3-diol monomethyl ether, cyclopentanol, cyclohexanol, cyclooctanol, cyclododecanol, trimethylolpropane, neopentyl glycol, pentaerythritol, butane-1,4-diol, hexane-1,6-diol, propane-1,3-diol, 2-ethylpropane-1,3-diol, 2-methylpropane-1,3-diol, ethylene glycol, diethylene glycol, triethylene glycol, tetraethylene glycol, pentaethylene glycol, glycerol, 1,2-dihydroxypropane, 2,2-dimethylethane-1,2-diol, butane-1,2-diol, butane-1,4-diol, 3-methylpentane-1,5-diol, 2-ethylhexane-1,3-diol, 2,4-diethyloctane-1,3-diol, neopentyl glycol hydroxypivalate, ditrimethylolpropane, dipentaerythritol, 2,2-bis(4-hydroxycyclohexyl)propane, cyclohexane-1,1-, -1,2-, -1,3- and -1,4-dimethanol, cyclohexane-1,2-, -1,3- or -1,4-diol, or mixtures thereof. These polyisocyanates having urethane and/or allophanate groups generally have an NCO content of 12% to 20% by weight and an average NCO functionality of 2.5 to 4.5.

5) Polyisocyanates comprising oxadiazinetrione groups, derived preferably from hexamethylene diisocyanate or isophorone diisocyanate. Such polyisocyanates comprising oxadiazinetrione groups are obtainable from diisocyanate and carbon dioxide.

6) Polyisocyanates comprising iminooxadiazinedione groups, derived preferably from hexamethylene diisocyanate or isophorone diisocyanate. Such polyisocyanates comprising iminooxadiazinedione groups are preparable from diisocyanates by means of specific catalysts.

7) Uretonimine-modified polyisocyanates.

8) Carbodiimide-modified polyisocyanates.

9) Hyperbranched polyisocyanates, of the kind known for example from DE-A1 10013186 or DE-A1 10013187.

10) Polyurethane-polyisocyanate prepolymers, from di- and/or polyisocyanates with alcohols.

11) Polyurea-polyisocyanate prepolymers.

Polyisocyanates 1) to 11) may be used in a mixture, optionally also in a mixture with diisocyanates.

In a preferred embodiment of the present invention, component (Aa) is a polyisocyanate and is selected from the group consisting of isocyanurates, biurets, urethanes and allophanates, preferably from the group consisting of isocyanurates, urethanes and allophanates, particularly preferably from the group consisting of isocyanurates and allophanates.

The fraction of other groups which form from isocyanate groups, especially of isocyanurate, biuret, uretdione, iminooxadiazinetrione and/or carbodiimide groups, is of minor significance in accordance with the invention.

In a further preferred embodiment, component (Aa) is polyisocyanates having isocyanurate groups. The isocyanatoisocyanurates generally have an NCO content of 10% to 30% by weight, in particular 15% to 25% by weight, and an average NCO functionality of 2.6 to 8.

In a preferred embodiment of the invention, the polyurethanes according to the invention have virtually no free isocyanate groups any longer; in other words, the content of free isocyanate groups is less than 0.5% by weight, preferably less than 0.3%, particularly preferably less than 0.2%, very particularly preferably less than 0.1%, in particular less than 0.05%, and especially 0% by weight.

As a result of their preparation, polyisocyanates (Aa) may still have a small fraction of their parent monomeric diisocyanate, this fraction being up to 5% by weight for example, particularly preferably up to 3% by weight, very particularly preferably up to 2%, in particular up to 1%, especially up to 0.5%, and even up to 0.25% by weight.

Useful as component (Ab) are according to the invention compounds which bear at least one isocyanate-reactive group and at least one maleimide, fumarate, maleate, acrylate, acrylamide, acrylonitrile, crotonate, cinnamate, methacrylamide and/or methacrylate group, preferably at least one acrylate and/or methacrylate group.

In a preferred embodiment of the invention, the compound (Ab) is compounds having one or two, particularly preferably exactly one isocyanate-reactive group. The number of maleimide, fumarate, maleate, acrylate, acrylamide, acrylonitrile, crotonate, cinnamate, methacrylamide and/or methacrylate groups is at least one, preferably one to five, particularly preferably one to four and very particularly preferably one to three maleimide, fumarate, maleate, acrylate, acrylamide, acrylonitrile, crotonate, cinnamate, methacrylamide and/or methacrylate groups, especially preferably one to three acrylate and/or methacrylate groups.

The components (Ab) preferably have a molar weight below 10 000 g/mol, particularly preferably below 5000 g/mol, very particularly preferably below 4000 g/mol, and in particular below 3000 g/mol. Specific compounds (Ab) have a molar weight below 1000 or even below 600 g/mol.

Isocyanate-reactive groups may, for example, be —OH, SH, —$NH_2$ and —$NHR^5$ where $R^5$ is hydrogen or an alkyl group comprising 1 to 4 carbon atoms, for example methyl, ethyl, n-propyl, isopropyl, n-butyl, isobutyl, sec-butyl or tert-butyl.

Isocyanate-reactive groups may preferably be —OH, —$NH_2$ or —$NHR^5$, particularly preferably —OH or —$NH_2$ and very particularly preferably —OH.

Examples of possible components (Ab) include monoesters of α,β-unsaturated carboxylic acids, such as acrylic acid, methacrylic acid, crotonic acid, itaconic acid, fumaric acid, maleic acid, acrylamidoglycolic acid, methacrylamidoglycolic acid or vinyl ethers with diols or polyols, having preferably 2 to 20 carbon atoms and at least two hydroxyl groups, such as ethylene glycol, diethylene glycol, triethylene glycol, 1,2-propylene glycol, 1,3-propylene glycol, 1,1-dimethylethane-1,2-diol, dipropylene glycol, triethylene glycol, tetraethylene glycol, pentaethylene glycol, tripropylene glycol, butane-1,2-, -1,3- or -1,4-diol, pentane-1,5-diol, neopentyl glycol, hexane-1,6-diol, 2-methylpentane-1,5-diol, 2-ethylbutane-1,4-diol, 1,4-dimethylolcyclohexane, 2,2-bis(4-hydroxycyclohexyl)propane, glycerol, trimethylolethane, trimethylolpropane, trimethylolbutane, pentaerythritol, ditrimethylolpropane, erythritol, sorbitol, polyTHF having a molar weight between 162 and 2000, polypropane-1,3-diol having a molar weight between 134 and 400 or polyethylene glycol having a molar weight between 238 and 458. In addition, it is also possible to use esters or amides of (meth)acrylic acid with amino alcohols, examples being 2-aminoethanol, 2-(methylamino)ethanol, 3-amino-1-propanol, 1-amino-2-propanol or 2-(2-aminoethoxy)ethanol, 2-mercaptoethanol or polyaminoalkanes, such as ethylenediamine or diethylenetriamine, or vinylacetic acid.

In addition, unsaturated polyetherols or polyesterols or polyacrylate polyols having an average OH functionality of 2 to 10 are also suitable, albeit less preferred.

Examples of amides of ethylenically unsaturated carboxylic acids with amino alcohols are hydroxyalkyl(meth)acrylamides such as N-hydroxymethylacrylamide, N-hydroxymethylmethacrylamide, N-hydroxyethylacrylamide, N-hydroxyethylmethacrylamide, 5-hydroxy-3-oxapentyl (meth)acrylamide, N-hydroxyalkylcrotonamides such as N-hydroxymethylcrotonamide or N-hydroxyalkylmaleimides such as N-hydroxyethylmaleimide.

Preference is given to using 2-hydroxyethyl (meth)acrylate, 2- or 3-hydroxypropyl (meth)acrylate, butane-1,4-diol mono(meth)acrylate, neopentyl glycol mono(meth)acrylate, pentane-1,5-diol mono(meth)acrylate, hexane-1,6-diol mono(meth)acrylate, glycerol mono(meth)acrylate and di(meth)acrylate, trimethylolpropane mono(meth)acrylate and di(meth)acrylate, pentaerythritol mono(meth)acrylate, di(meth)acrylate, and tri(meth)acrylate, and also 4-hydroxybutyl vinyl ether, 2-aminoethyl (meth)acrylate, 2-aminopropyl (meth)acrylate, 3-aminopropyl (meth)acrylate, 4-aminobutyl (meth)acrylate, 6-aminohexyl (meth)acrylate, 2-thioethyl (meth)acrylate, 2-aminoethyl(meth)acrylamide, 2-aminopropyl(meth)acrylamide, 3-aminopropyl(meth) acrylamide, 2-hydroxyethyl(meth)acrylamide, 2-hydroxypropyl(meth)acrylamide or 3-hydroxypropyl(meth)acrylamide. Particular preference is given to 2-hydroxyethyl acrylate, 2-hydroxyethyl methacrylate, 2- or 3-hydroxypropyl acrylate, butane-1,4-diol monoacrylate, 3-(acryloyloxy)-2-hydroxypropyl (meth)acrylate, and the monoacrylates of polyethylene glycol of molar mass 106 to 238.

Examples of useful components (Ac) include compounds having at least two, preferably exactly two, isocyanate-reactive groups, for example —OH, —SH, —NH, or —NHR$^5$ in which R$^5$ may independently be hydrogen, methyl, ethyl, isopropyl, n-propyl, n-butyl, isobutyl, sec-butyl or tert-butyl.

Isocyanate-reactive groups may preferably be —OH, —NH$_2$ or —NHR$^5$, particularly preferably —OH or —NH, and very particularly preferably —OH.

These are preferably diols having 2 to 20 carbon atoms, examples being ethylene glycol, propane-1,2-diol, propane-1,3-diol, 1,1-dimethylethane-1,2-diol, 2-butyl-2-ethylpropane-1,3-diol, 2-ethylpropane-1,3-diol, 2-methylpropane-1,3-diol, neopentyl glycol, neopentyl glycol hydroxypivalate, butane-1,2-, -1,3- or -1,4-diol, hexane-1,6-diol, decane-1,10-diol, bis(4-hydroxycyclohexane)isopropylidene, tetramethylcyclobutanediol, cyclohexane-1,2-, -1,3- or -1,4-diol, cyclooctanediol, norbornanediol, pinanediol, decalindiol, 2-ethylhexane-1,3-diol, 2,4-diethyloctane-1,3-diol, hydroquinone, bisphenol A, bisphenol F, bisphenol B, bisphenol S, 2,2-bis(4-hydroxycyclohexyl)propane, cyclohexane-1,1-, -1,2-, -1,3-, and -1,4-dimethanol, cyclohexane-1,2-, -1,3- or -1,4-diol, polyTHF having a molar mass between 162 and 2000, polypropane-1,2-diol or polypropane-1,3-diol having a molar mass between 134 and 1178 or polyethylene glycol having a molar mass between 106 and 2000, and aliphatic diamines, such as methylene- and isopropylidenebis(cyclohexylamine), piperazine, 1,2-, 1,3- or 1,4-diaminocyclohexane, 1,2-, 1,3- or 1,4-cyclohexane bis(methylamine), etc., dithiols or polyfunctional alcohols, secondary or primary amino alcohols, such as ethanolamine, monopropanolamine, etc., or thio alcohols, such as thioethylene glycol.

Polyester polyols are known, for example, from Ullmanns Encyklopadie der technischen Chemie, 4th edition, volume 19, pp 62 to 65. Preference is given to using polyester polyols obtained by reaction of dihydric alcohols with dibasic carboxylic acids. Instead of using the free polycarboxylic acids, the polyester polyols may also be prepared using the corresponding polycarboxylic anhydrides or corresponding polycarboxylic esters of lower alcohols or mixtures thereof. The polycarboxylic acids may be aliphatic, cycloaliphatic, araliphatic, aromatic or heterocyclic and may optionally be substituted, for example by halogen atoms, and/or unsaturated. Examples thereof include:

oxalic acid, maleic acid, fumaric acid, succinic acid, glutaric acid, adipic acid, sebacic acid, dodecanedioic acid, o-phthalic acid, isophthalic acid, terephthalic acid, trimellitic acid, azelaic acid, 1,4-cyclohexanedicarboxylic acid or tetrahydrophthalic acid, suberic acid, azelaic acid, phthalic anhydride, tetrahydrophthalic anhydride, hexahydrophthalic anhydride, tetrachlorophthalic anhydride, endomethylenetetrahydrophthalic anhydride, glutaric anhydride, maleic anhydride, dimeric fatty acids, their isomers and hydrogenation products, and also esterifiable derivatives, such as anhydrides or dialkyl esters, for example C$_1$-C$_4$-alkyl esters, preferably methyl, ethyl or n-butyl esters, of said acids are used. Preference is given to dicarboxylic acids of the general formula HOOC—(CH$_2$)$_y$—COOH where y is a number from 1 to 20, preferably an even number from 2 to 20; particularly preferably succinic acid, adipic acid, sebacic acid, and dodecanedicarboxylic acid.

Suitable polyhydric alcohols for preparing the polyesterols include propane-1,2-diol, ethylene glycol, 2,2-dimethylethane-1,2-diol, propane-1,3-diol, butane-1,2-diol, butane-1,3-diol, butane-1,4-diol, 3-methylpentane-1,5-diol, 2-ethylhexane-1,3-diol, 2,4-diethyloctane-1,3-diol, hexane-1,6-diol, polyTHF having a molar mass between 162 and 2000, polypropane-1,3-diol having a molar mass between 134 and 1178, polypropane-1,2-diol having a molar mass between 134 and 898, polyethylene glycol having a molar mass between 106 and 458, neopentyl glycol, neopentyl glycol hydroxypivalate, 2-ethylpropane-1,3-diol, 2-methylpropane-1,3-diol, 2,2-bis(4-hydroxycyclohexyl)propane, cyclohexane-1,1-, -1,2-, -1,3- and -1,4-dimethanol, cyclohexane-1,2-, -1,3- or -1,4-diol, trimethylolbutane, trimethylolpropane, trimethylolethane, neopentyl glycol, pentaerythritol, glycerol, ditrimethylolpropane, dipentaerythritol, sorbitol, mannitol, diglycerol, threitol, erythritol, adonitol (ribitol), arabitol (lyxitol), xylitol, dulcitol (galactitol), maltitol or isomalt, which may optionally have been alkoxylated as described above.

Preferred alcohols are those of the general formula HO—(CH$_2$)$_x$—OH where x is a number from 1 to 20, preferably an even number from 2 to 20. Preference is given to ethylene glycol, butane-1,4-diol, hexane-1,6-diol, octane-1,8-diol, and dodecane-1,12-diol. Further preference is given to neopentyl glycol.

In addition, polycarbonate diols are also useful, as can be obtained for example by reacting phosgene with an excess of the low molecular weight alcohols mentioned as formation components for the polyester polyols.

Other polyester diols which are suitable are based on lactones, taking the form of lactone homopolymers or copolymers, preferably terminal hydroxyl-comprising addition products of lactones onto suitable difunctional starter molecules. Suitable lactones are preferably those which are derived from compounds of the general formula HO—(CH$_2$)$_z$—COOH where z is a number from 1 to 20 and one hydrogen atom of a methylene unit may also be replaced by a C$_1$ to C$_4$ alkyl radical. Examples are ε-caprolactone, β-propiolactone, gamma-butyrolactone and/or methyl-ε-caprolactone, 4-hydroxybenzoic acid, 6-hydroxy-2-naphthoic acid or pivalolactone, and mixtures thereof. Examples of suitable starter components are the low molecular weight dihydric alcohols which have been mentioned above as formation component for the polyester polyols. The corresponding polymers of ε-caprolactone are particularly preferred. Lower polyester diols or polyether diols may also be employed as starters for preparing the lactone polymers. Instead of the polymers of lactones, the corresponding, chemically equivalent polycondensates of the hydroxycarboxylic acids corresponding to the lactones may also be employed.

Particularly suitable here are the cycloaliphatic diols, for example bis(4-hydroxycyclohexane)isopropylidene, tetramethylcyclobutanediol, cyclohexane-1,2-, -1,3- or -1,4-diol, cyclohexane-1,1-, -1,2-, -1,3- and -1,4-dimethanol, cyclooctanediol or norbornanediol.

Compounds (Ac) having more than two isocyanate-reactive groups may preferably be polyols having preferably 2 to 20 carbon atoms, examples being trimethylolbutane, trimethylolpropane, trimethylolethane, pentaerythritol, glycerol, ditrimethylolpropane, dipentaerythritol, sorbitol, mannitol, diglycerol, threitol, erythritol, adonitol (ribitol), arabitol (lyxitol), xylitol, dulcitol (galactitol), maltitol, isomalt; particular preference is given to trimethylolpropane, pentaerythritol and glycerol, and very particular preference to trimethylolpropane.

Optional components (Ae) are those having optionally at least one compound having exactly one isocyanate-reactive group.

The components in question are preferably monools, particularly preferably alkanols, and very particularly preferably alkanols having 1 to 20, preferably 1 to 12, particularly preferably 1 to 6, very particularly preferably 1 to 4, and especially 1 to 2 carbon atoms.

Examples thereof are methanol, ethanol, isopropanol, n-propanol, n-butanol, isobutanol, sec-butanol, tert-butanol, n-hexanol, n-heptanol, n-octanol, n-decanol, n-dodecanol (lauryl alcohol), 2-ethylhexanol, cyclopentanol, cyclohexanol, cyclooctanol, cyclododecanol, ethylene glycol monomethyl ether, ethylene glycol monoethyl ether, diethylene glycol, propane-1,3-diol monomethyl ether, preferably methanol, ethanol, isopropanol, n-propanol, n-butanol, tert-butanol, n-hexanol, 2-ethylhexanol, cyclopentanol, cyclohexanol, and cyclododecanol, particularly preferably methanol, ethanol, isopropanol, n-propanol, n-butanol and tert-butanol, very particularly preferably methanol and ethanol, and especially methanol.

In a preferred embodiment, the monools may be the cycloaliphatic alcohols mentioned, preferably cyclopentanol or cyclohexanol, particularly preferably cyclohexanol.

In a further preferred embodiment, the monools may be the mentioned aliphatic alcohols having 6 to 20 carbon atoms, particularly preferably those having 8 to 20 carbon atoms, very particularly preferably those having 10 to 20 carbon atoms.

In a particularly preferred embodiment, the monools are the aliphatic alcohols mentioned, very particularly preferably those having 1 to 4 carbon atoms, especially methanol.

(Ag) the mandatory compounds (Ag) are those having at least one isocyanate-reactive group and at least one dispersing group.

Compounds preferred as component (Ag) have at least one, preferably exactly one, isocyanate-reactive group and exactly one dispersing group.

The dispersing groups may be (Ag1) anionic groups or groups that can be converted into anionic groups.

Compounds (Ag1) comprise exactly one isocyanate-reactive group and at least one hydrophilic anionic group or hydrophilic group that can be converted into an anionic group. Examples of the compounds in question are those as described in EP-A1 703 255, particularly from page 3 line 54 to page 4 line 38 therein, in DE A1 197 24 199, particularly from page 3 line 4 to line 30 therein, in DE A1 40 10 783, particularly from column 3 line 3 to line 40 therein, in DE A1 41 13 160, particularly from column 3 line 63 to column 4 line 4 therein, and in EP-A2 548 669, particularly from page 4 line 50 to page 5 line 6 therein. Reference is hereby expressly made to these documents as part of the present disclosure.

Preferred compounds (Ag1) are those having the general formula

RG-R$^3$-DG in which
RG is at least one isocyanate-reactive group,
DG is at least one dispersing group and
R$^3$ is an aliphatic, cycloaliphatic or aromatic radical comprising 1 to 20 carbon atoms.

Examples of isocyanate-reactive groups RG are —OH, —SH, —NH$_2$ or —NHR$^5$, in which R$^5$ is as defined above but may be different from the radical used there; preferably —OH, —NH$_2$ or —NHR$^5$, particularly preferably —OH or —NH$_2$, and very particularly preferably —OH.

Examples of DG are —COOH, —SO$_3$H, —PO$_3$H and the anionic forms thereof, which may be associated with any desired counterion, e.g. Li$^+$, Na$^+$, K$^+$, Cs$^+$, Mg$^{2+}$, Ca$^{2+}$ or Ba$^{2+}$. As counterion, it is further possible for ammonium ions or quaternary ammonium ions derived from ammonia or amines, especially tertiary amines, to be associated as counterion, for example ammonium, methylammonium, dimethylammonium, trimethylammonium, ethylammonium, diethylammonium, triethylammonium, tributylammonium, diisopropylethylammonium, benzyldimethylammonium, monoethanolammonium, diethanolammonium, triethanolammonium, hydroxyethyldimethylammonium, hydroxyethyldiethylammonium, monopropanolammonium, dipropanolammonium, tripropanolammonium, piperidinium, piperazinium, N,N'-dimethylpiperazinium, morpholinium, pyridinium, tetramethylammonium, triethylmethylammonium, 2-hydroxyethyltrimethylammonium, bis(2-hydroxyethyl)dimethylammonium, tris(2-hydroxyethyl)methylammonium.

R$^3$ is preferably methylene, 1,2-ethylene, 1,2-propylene, 1,3-propylene, 1,2-butylene, 1,4-butylene, 1,3-butylene, 1,6-hexylene, 1,8-octylene, 1,12-dodecylene, 1,2-phenylene, 1,3-phenylene, 1,4-phenylene, 1,2-naphthylene, 1,3-naphthylene, 1,4-naphthylene, 1,6-naphthylene, 1,2-cyclopentylene, 1,3-cyclopentylene, 1,2-cyclohexylene, 1,3-cyclohexylene or 1,4-cyclohexylene.

Component (Ag1) is preferably, for example, hydroxyacetic acid, tartaric acid, lactic acid, 3-hydroxypropionic acid, hydroxypivalic acid, mercaptoacetic acid, mercaptopropionic acid, thiolactic acid, mercaptosuccinic acid, glycine, iminodiacetic acid, sarcosine, alanine, β-alanine, leucine, isoleucine, aminobutyric acid, hydroxysuccinic acid, hydroxydecanoic acid, ethylenediaminetriacetic acid, hydroxydodecanoic acid, hydroxyhexadecanoic acid, 12-hydroxystearic acid, aminonaphthalenecarboxylic acid, hydroxyethanesulfonic acid, hydroxypropanesulfonic acid, mercaptoethanesulfonic acid, mercaptopropanesulfonic acid, aminomethanesulfonic acid, taurine, aminopropanesulfonic acid, N-alkylated or N-cycloalkylated aminopropanesulfonic or aminoethanesulfonic acids, examples being N-cyclohexylaminoethanesulfonic acid or N-cyclohexylaminopropanesulfonic acid, and also their alkali metal, alkaline earth metal or ammonium salts, and with particular preference the stated monohydroxycarboxylic and monohydroxysulfonic acids, and also monoaminocarboxylic and monoaminosulfonic acids.

Further preferred compounds (Ag1) are those having exactly one dispersing group DG and at least two isocyanate-reactive groups RG, where here also DG is —COOH, —SO$_3$H or —PO$_3$H and the anionic forms thereof, which may be associated with any desired counterion, DG is preferably —COOH groups, and where here also the reactive groups RG can be —OH, —SH, —NH$_2$ or —NHR$^5$, in which R$^5$ is as defined above, preferably —OH, —NH$_2$ or —NHR$^5$, particularly preferably —OH or —NH$_2$, and very particularly preferably —OH.

Examples of these include dimethylolpropionic acid, dimethylolbutyric acid, trimethylolacetic acid, 3,5-dihydroxybenzoic acid, 2,5-dihydroxybenzoic acid, 3,4-dihydroxybenzoic acid, 2,4-dihydroxybenzoic acid, 2,4-dihydroxy-3,6-dimethylbenzoic acid, sugar acids, 4-amino-2-hydroxybenzoic acid, 5-amino-2-hydroxybenzoic acid, 3,5-diaminobenzoic acid, 1-amino-2-hydroxynaphthalene-4-sulfonic acid, 4,5-dihydroxynaphthalene-2,7-disulfonic acid, 4-amino-5-hydroxynaphthalene-2,7-disulfonic acid and gallic acid, preferably dimethylolpropionic acid, dimethylolbutyric acid and trimethylolacetic acid, particularly preferably dimethylolpropionic acid.

For the preparation of the dispersion, the aforementioned acids, if they are not already salts, are partly or fully neutralized, preferably with alkali metal salts or amines, preferably tertiary amines.

In order to achieve good dispersing activity, the polyurethanes according to the invention preferably have a concentration of the molecules bearing dispersing anionic groups of 1 to 25 mol %, based on a functional group and isocyanate groups, preferably at least 3 mol % and particularly preferably from 5 to 15 mol %.

The polyurethanes which can be used according to the invention are obtained by reacting components (Aa), (Ab) and (Ag) and optionally (Ac) and/or (Ae) with one another.

In this reaction, the molar composition of (Aa):(Ab):(Ac):(Ae):(Ag) per 1 mol of reactive isocyanate groups in (Aa) is generally as follows:

(Ab) 1-50, preferably 5-40, particularly preferably 10-37.5 and especially 15-33 mol % of isocyanate-reactive groups, (Ac) 0-50, preferably 0-30, particularly preferably 0-25 and especially 0-20 mol % of isocyanate-reactive groups, (Ae) 0-5, preferably 0-4, particularly preferably 0-3 and especially 0-2 mol % of isocyanate-reactive groups, (Ag) 1-25, preferably 2-20, particularly preferably 3-15 and especially 5-15 mol % of isocyanate-reactive groups, with the proviso that the sum total of the isocyanate-reactive groups corresponds to the number of isocyanate groups in (Aa).

The formation of the adduct of compound comprising isocyanate groups and the compound comprising isocyanate-reactive groups is generally effected by mixing of the components in any order, optionally at elevated temperature.

The compound comprising isocyanate groups is here preferably added to the compound comprising isocyanate-reactive groups, preferably in a plurality of steps.

Particular preference is given to initially charging the compound comprising isocyanate groups and adding the compounds comprising isocyanate-reactive groups. In particular, the compound (Aa) comprising isocyanate groups is initially charged and then (Ab) and/or (Ag) are added. Thereafter it is possible to add optionally desired further components. In what is known as the "prepolymer mixing process", a prepolymer is first prepared from the components (Aa) to (Ag). This can, if necessary, be effected in a solvent which is miscible with water and boils below 100° C. at standard pressure, preferably acetone, ethyl methyl ketone or diethyl ketone. The prepolymer is first dispersed in water and optionally simultaneously and/or subsequently crosslinked by reaction of the isocyanate groups with amines bearing more than two isocyanate-reactive amino groups or chain-extended with amines bearing two isocyanate-reactive amino groups. Chain extension also occurs when no amine is added. In this case, excess isocyanate groups are hydrolyzed to amine groups, which react with any remaining isocyanate groups of the prepolymers to effect chain extension.

In general, the reaction is carried out at temperatures between 5 and 100° C., preferably between 20 to 90° C., particularly preferably between 40 and 80° C., and especially between 60 and 80° C.

Preference is given to working under anhydrous conditions during the preparation of the polyurethane.

Anhydrous here means that the water content of the reaction system is not more than 5% by weight, preferably not more than 3% by weight, and particularly preferably not more than 1% by weight; very particularly preferably it is not more than 0.75% and especially not more than 0.5% by weight.

The reaction is carried out preferably in the presence of at least one oxygen-containing gas, examples being air or air/nitrogen mixtures, or mixtures of oxygen or an oxygen-containing gas with a gas which is inert under the reaction conditions, having an oxygen content of below 15%, preferably below 12%, particularly preferably below 10%, very particularly preferably below 8%, and especially below 6% by volume.

The reaction can also be carried out in the presence of an inert solvent, examples being acetone, isobutyl methyl ketone, toluene, xylene, butyl acetate, methoxypropyl acetate, methyl ethyl ketone or ethoxyethyl acetate. With preference, however, the reaction is carried out in the absence of a solvent.

In one preferred embodiment, the reaction of (Aa) with (Ab) can be carried out under allophanatization conditions.

Typical catalysts for such a reaction are organozinc compounds, such as zinc acetylacetonate or zinc 2-ethylcaproate, or a tetraalkylammonium compound, such as N,N,N-trimethyl-N-2-hydroxypropylammonium hydroxide or such as N,N,N-trimethyl-N-2-hydroxypropylammonium 2-ethyl-hexanoate, or organotin compounds, such as dibutyltin dilaurate.

As catalysts these preferably bismuth compounds, zinc compounds and/or titanium compounds, preferably of a bismuth compound and/or titanium compound and particularly preferably of a of a bismuth compound.

Useful zinc and bismuth compounds include those in which the following anions are used: $F^-$, $Cl^-$, $ClO^-$, $ClO_3^-$, $ClO_4^-$, $Br^-$, $I^-$, $IO_3^-$, $CN^-$, $OCN^-$, $NO_2^-$, $NO_3^-$, $HCO_3^-$, $CO_3^{2-}$, $S^{2-}$, $SH^-$, $HSO_3^-$, $SO_3^{2-}$, $HSO_4^-$, $SO_4^{2-}$, $S_2O_2^{2-}$, $S_2O_4^{2-}$, $S_2O_5^{2-}$, $S_2O_6^{2-}$, $S_2O_7^{2-}$, $S_2O_8^{2-}$, $H_2PO_2^-$, $H_2PO_4^-$, $HPO_4^{2-}$, $PO_4^{3-}$, $P_2O_7^{4-}$, $(OC_nH_{2n+1})^-$, $(C_nH_{2n-1}O_2)^-$, $(C_nH_{2n-3}O_2)^-$ and $(C_{n+1}H_{2n-2}O_4)^{2-}$, where n represents the numbers 1 to 20. Preference is given to the carboxylates in which the anion obeys the formulae $(C_nH_{2n-1}O_2)^-$ and $(C_{n+1}H_{2n-2}O_4)^{2-}$ where n is 1 to 20. Particularly preferred salts have, as anions, monocarboxylates of the general formula $(C_nH_{2n-1}O_2)^-$ where n represents the numbers 1 to 20. Particular mention should be made here of formate, acetate, propionate, hexanoate, neodecanoate and 2-ethyl-hexanoate.

Among the zinc catalysts, preference is given to the zinc carboxylates, particular preference to those of carboxylates having at least six carbon atoms, very particularly preferably at least eight carbon atoms, especially zinc(II) diacetate or zinc(II) dioctoate or zinc(II) neodecanoate. Commercially available catalysts are, for example, Borchi® Kat 22 from OMG Borchers GmbH, Langenfeld, Germany.

Among the bismuth catalysts, preference is given to the bismuth carboxylates, particular preference to those of carboxylates having at least six carbon atoms, especially bismuth octoates, ethylhexanoates, neodecanoates or pivalates; for example K-KAT 348, XC-B221; XC-C227, XC 8203 and XK-601 from King Industries, TIB KAT 716, 716LA, 716XLA, 718, 720, 789 from TIB Chemicals and those from Shepherd Lausanne, and also, for example, Borchi® Kat 24; 315; 320 from OMG Borchers GmbH, Langenfeld, Germany.

Mixtures of different metals may also be involved, as, for example, in Borchi® Kat 0245 from OMG Borchers GmbH, Langenfeld, Germany.

Among the titanium compounds, preference is given to the titanium tetraalkoxides $Ti(OR)_4$, particular preference to those of alcohols ROH having 1 to 8 carbon atoms, for example methanol, ethanol, isopropanol, n-propanol, n-butanol, isobutanol, sec-butanol, tert-butanol, n-hexanol, n-heptanol, n-octanol, preferably methanol, ethanol, isopropanol, n-propanol, n-butanol, tert-butanol, particularly preferably isopropanol and n-butanol.

In a further preferred embodiment, compounds are used of the kind described in WO 00/39183, p. 4, l. 3 to p. 10, l. 19, the disclosure of which is hereby made part of the present specification. Particular preference among these compounds is given to those having, as formation components, at least one (cyclo)aliphatic isocyanate which comprises allophanate groups, and at least one hydroxyalkyl (meth)acrylate, very particular preference being given to products 1 to 9 in table 1 on p. 24 of WO 00/39183.

Water-Emulsifiable Thiol (B)

According to the invention, the thiol (B) comprises, as formation components, (Ba) at least one compound having at least two mercapto groups, (Bb) at least one compound having at least one mercapto-reactive group and at least one dispersing group, wherein the formation component (Ba) has a Hansch parameter of at least 2.0.

According to the invention, the formation component (Ba) has at least two mercapto groups, for example two to six, preferably two to four and particularly preferably three to four.

According to the invention, mercapto groups are understood to mean —SH groups, particularly those bonded to tertiary carbon atoms, methine groups or methylene groups, particularly preferably those bonded to methylene groups.

According to the invention, the formation component (Ba) has a Hansch parameter of at least 2.0, preferably of at least 2.0 and of at most 4.0, particularly preferably of at least 2.6 to at most 3.6.

The Hansch parameters are generally a measure of the hydrophobicity of chemical compounds such as for example monomers and the polymers formed therefrom. The theoretical foundations for the calculation of the Hansch parameters come from: Hansch, Fujita, J. Amer. Chem. Soc., 1964, 86, pages 1616-1626; H. Kubinyi, Methods and Principles of Medicinal Chemistry, Volume 1, R. Mannhold et al., publisher: VCH, Weinheim (1993); C. Hansch and A. Leo, Substituent Constants for Correlation Analysis, in Chemistry and Biology, Wiley, New York (1979); and C. Hansch, P. Maloney, T. Fujita, and R. Muir, Nature, 1962, 194, pages 178-180.

The Hansch parameters can generally be calculated using the "KOWWIN v1.68" (September 2010) software which is made available to the public by the US Environmental Protection Agency (EPA) as "Estimation Programs Interface Suite™ for Microsoft® Windows, v4.11" [2012], United States Environmental Protection Agency, Washington, D.C., USA. This program ascertained the Hansch parameters for the formation components (Ba) that were among those used in this document.

The formation components (Ba) preferably have a molecular weight of less than 1500 g/mol, particularly preferably less than 1000 g/mol, very particularly preferably less than 500 g/mol.

In a preferred embodiment, the formation components (Ba) are liquid at 20° C. and a pressure of 1.01325 bar.

Particularly preferred formation components (Ba) are trimethylolpropane trismercaptopropionate (=TMPMP), pentaerythritol tetramercaptopropionate (=PETMP), dipentaerythritol hexamercaptopropionate (=DIPETMP) and polycaprolactone tetramercaptopropionate (=PCL4MP 1350).

According to the invention, the formation component (Bb) has at least one mercapto-reactive group and at least one dispersing group.

The mercapto-reactive group is preferably a glycidyl, maleimide, fumarate, maleate, acrylate, itaconate, acrylamide, methylenemalonate, crotonate, cinnamate, methacrylamide and/or methacrylate group. Particular preference is given to unsaturated groups, and very particularly preferably it is an acrylate or methacrylate group.

The dispersing group may be for example an ionic group or a group that can be converted into an ionic group.

Examples of anionic groups or groups that can be converted into anionic groups include carboxylic acid, phosphonic acid or sulfonic acid groups, but also phosphoric acid or sulfuric acid monoester groups.

Preferred anionic groups or groups that can be converted into anionic groups are phosph(on)ate, sulf(on)ate and/or carboxylate groups.

Examples of cationic groups or groups that can be converted into cationic groups include quaternary ammonium groups and tertiary, secondary or primary amino groups.

Groups that can be converted into ionic groups are preferably converted into ionic groups prior to or during the dispersion of the mixture according to the invention in water.

For the conversion, for example, of carboxylic acid groups or sulfonic acid groups into anionic groups, it is possible to use inorganic and/or organic bases such as sodium hydroxide, potassium hydroxide, potassium carbonate, sodium hydrogencarbonate, ammonia, or primary, secondary and especially tertiary amines, for example triethylamine or dimethylaminopropanol.

For the conversion of amino groups into the corresponding cation, e.g. ammonium groups, suitable as neutralizing agents are inorganic or organic acids, for example hydro-

| Thiol | (abbreviation) | calculated individual Hansch parameter |
|---|---|---|
| ethoxylated trimethylolpropane trismercaptopropionate | ETTMP 1300 | ≤0*) |
| glycol dimercaptoacetate | GDMA | 0.3 |
| pentaerythritol tetramercaptoacetate | PETMA | 0.6 |
| glycol dimercaptopropionate | GDMP | 1.3 |
| trimethylolpropane trismercaptoacetate | TMPMA | 1.6 |
| ethoxylated trimethylolpropane trismercaptopropionate | ETTMP 700 | 1.7 |
| pentaerythritol tetramercaptopropionate | PETMP | 2.6 |
| trimethylolpropane trismercaptopropionate | TMPMP | 3.1 |
| dipentaerythritol hexamercaptopropionate | DIPETMP | 3.6 |
| polycaprolactone tetramercaptopropionate | PCL4MP 1350 | 3.8**) |
| tris[2-(3-mercaptopropionyloxy)ethyl] isocyanurate | TEMPIC | 4.0 |

*)estimate
**)for substructure chloric acid, acetic acid, fumaric acid, maleic acid, lactic acid, tartaric acid, oxalic acid or phosphoric acid, or, suitable as quaternizing agents are, for example, methyl chloride, methyl iodide, diethyl sulfate, benzyl chloride, ethyl chloroacetate or bromoacetamide. Further suitable neutralizing and quaternizing agents are described, for example, in U.S. Pat. No. 3,479,310, column 6.

The content of the ionic groups or groups that can be converted into ionic groups is preferably 0.1 to 1.0 mol per kg of component (B).

The dispersing group may be for example a nonionic, hydrophilic group. Examples of nonionic groups are polyalkylene ether groups, in particular those having 5 to 50 alkylene oxide units.

Preference is given to polyethylene ether groups or polyalkylene ether groups which, in addition to other alkylene oxide units, for example propylene oxide, comprise at least 5, preferably at least 7, ethylene oxide units. Particular preference is given to polyethylene ether groups.

The content of the hydrophilic nonionic groups, in particular the polyalkylene ether groups, is preferably 5 to 30 mol %, particularly preferably 10 to 20 mol %, based on the component (Ba).

The at least one dispersing group is likewise preferably polyalkylene ether alcohols, particularly preferably polyethylene ether alcohols (=PEG capped at one end) or polyethylene glycol.

The polyalkylene ether alcohols and polyethylene ether alcohols preferably have a molecular weight Mn of at least 200, particularly preferably at least 300 g/mol. The molecular weight Mn may in principle have no upper limit, and preferably be up to 2200, particularly preferably up to 1200 g/mol and very particularly preferably up to 800 g/mol.

Particularly preferred formation components (Bb) are (meth)acrylic acid, beta-carboxyethyl acrylate, phosphoric monoester of a polypropylene glycol methacrylate, phosphoric monoester of hydroxyethyl methacrylate, 2-acrylamido-2-methylpropanesulfonic acid, sulf(at)oethyl methacrylate, sulfopropyl methacrylate, and also the sodium or ammonium salts of all of the aforementioned compounds, sodium styrenesulfonate and mono(meth)acrylic esters of pure polyethylene glycol or of mono-end-group-capped polyethylene glycol.

Very particularly preferred formation components (Bb) are methacrylic acid, beta-carboxyethyl acrylate (=Sipomer® β-CEA) and methacrylic monoesters of methoxypolyethylene glycol (e.g. Bisomer® MPEG-350 MA, Bisomer® MPEG-550 MA or Bisomer® S-7-W).

To prepare component (B), the at least one formation component (Ba) is reacted with at least one compound (Bb).

Preferred components (B) are those having hydrophilic, nonionic groups, especially polyalkylene ether groups. In this case, the water emulsifiability is preferably achieved solely by the hydrophilic nonionic groups.

The thiol (B) can then be emulsified in water with the input of mechanical energy. The ratio of thiol (B) to water is preferably 25:75 to 80:20, particularly preferably 30:70 to 40:60, very particularly preferably 30:70 to 50:50.

To prepare the coating compositions according to the invention, the polymer mixture (A) and the thiol (B) are either prepared separately from one another and then the aqueous dispersion of the polymer mixture (A) and the aqueous emulsion of the thiol (B) are mixed with one another, or the polymer mixture (A) is prepared as aqueous dispersion and the thiol (B) is mixed into the aqueous dispersion thus obtained.

It is essential that the two-component coating compositions according to the invention comprise ≥20% by weight, advantageously ≥30% by weight and particularly advantageously ≥30% by weight of water and ≤5% by weight, advantageously ≤3% by weight and particularly advantageously ≤1% by weight of organic solvent. Correspondingly, the binder formulation according to the invention has a content of active binder components, formed from the sum of the at least one polymer mixture (A) and the at least one thiol (B), in the range of ≥5% and ≤75% by weight, advantageously in the range of ≥10% and ≤70% by weight and particularly advantageously in the range of ≥30% and ≤60% by weight.

The molar ratio of mercapto-reactive groups from the water-dispersible polymer mixture (A) to mercapto groups in thiol (B) is preferably from 3:1 to 1:1.1, particularly preferably from 2:1 to 1:1.05, very particularly preferably 2:1 to 1:1.

The two-component coating compositions of the invention can be used to coat a variety of substrates, such as wood, wood veneer, paper, paperboard, cardboard, textile, leather, nonwoven, plastics surfaces, glass, ceramic, mineral building materials, and coated or uncoated metals.

In the case of use in coating agents, the two-component coating compositions according to the invention can be used in primers, primer surfacers, pigmented topcoats and clearcoats in the sectors of automotive refinishing and finishing of large vehicles. Such coating agents are especially suitable for applications requiring particularly high application reliability, exterior weathering resistance, optical qualities, solvent resistance, chemical resistance and water resistance, such as in automotive refinishing and finishing of large vehicles.

The coating compositions of the invention are suitable for the coating of substrates such as wood, paper, textile, leather, nonwoven, plastics surfaces, glass, ceramic, mineral building materials, such as cement moldings and fiber-cement slabs, or coated or uncoated metals, preferably plastics or metals, particularly in the form of thin sheets, and with particular preference metals.

The coating compositions of the invention are suitable as or in exterior coatings, in other words in those applications involving exposure to daylight, preferably parts of buildings, interior coatings, and coatings on vehicles and aircraft. In particular, the coating compositions of the invention are used as or in automotive clearcoats and topcoats. Further preferred fields of use are can coating and coil coating.

In particular, they are suitable as primers, primer surfacers, pigmented topcoats, and clearcoats in the sectors of industrial coating, wood coating, automotive finishing, especially OEM finishing, or decorative coating. The coating agents are very particularly suitable for applications requiring particularly high application reliability, exterior weathering resistance, optical qualities, scratch resistance, solvent resistance and/or chemical resistance.

Furthermore, the two-component coating compositions may optionally comprise further typical coatings additives.

As further typical coatings additives it is possible for example to use antioxidants, stabilizers, activators (accelerators), photoinitiators, fillers, pigments, dyes, antistats, flame retardants, thickeners, thixotropic agents, surface-active agents, viscosity modifiers, plasticizers or chelating agents.

Photoinitiators may be, for example, photoinitiators known to those skilled in the art, examples being those specified in "Advances in Polymer Science", Volume 14, Springer Berlin 1974 or in K. K. Dietliker, Chemistry and Technology of UV and EB Formulation for Coatings, Inks and Paints, Volume 3; Photoinitiators for Free Radical and Cationic Polymerization, P. K. T. Oldring (Eds.), SITA Technology Ltd, London.

Possible options include, for example, mono- or bisacylphosphine oxides, as described, for example, in EP-A 7 508, EP-A 57 474, DE-A 196 18 720, EP-A 495 751 or EP-A 615 980, examples being 2,4,6-trimethylbenzoyldiphenylphosphine oxide (Lucirin® TPO from BASF AG), ethyl 2,4,6-trimethylbenzoylphenylphosphinate (Lucirin® TPO L from BASF AG), bis(2,4,6-trimethylbenzoyl)phenylphosphine oxide (Irgacure® 819 from Ciba Spezialitätenchemie), benzophenones, hydroxyacetophenones, phenylglyoxylic acid and derivatives thereof, or mixtures of these photoinitiators. Examples include benzophenone, acetophenone, acetonaphthoquinone, methyl ethyl ketone, valerophenone, hexanophenone, α-phenylbutyrophenone, p-morpholinopropiophenone, dibenzosuberone, 4-morpholinobenzophenone, 4-morpholinodeoxybenzoin, p-diacetylbenzene, 4-aminobenzophenone, 4'-methoxyacetophenone, β-methylanthraquinone, tert-butylanthraquinone, anthraquinonecarboxylic esters, benzaldehyde, α-tetralone, 9-acetylphenanthrene, 2-acetylphenanthrene, 10-thioxanthenone, 3-acetylphenanthrene, 3-acetylindole, 9-fluorenone, 1-indanone, 1,3,4-triacetylbenzene, thioxanthen-9-one, xanthen-9-one, 2,4-dimethylthioxanthone, 2,4-diethylthioxanthone, 2,4-diisopropylthioxanthone, 2,4-dichlorothioxanthone, benzoin, benzoin isobutyl ether, chloroxanthenone, benzointetrahydropyranyl ether, benzoin methyl ether, benzoin ethyl ether, benzoin butyl ether, benzoin isopropyl ether, 7H-benzoin methyl ether, benz[de]anthracene-7-one, 1-naphthaldehyde, 4,4'-bis(dimethylamino)benzophenone, 4-phenylbenzophenone, 4-chlorobenzophenone, Michler's ketone, 1-acetonaphthone, 2-acetonaphthone, 1-benzoylcyclohexan-1-ol, 2-hydroxy-2,2-dimethylacetophenone, 2,2-dimethoxy-2-phenylacetophenone, 2,2-diethoxy-2-phenylacetophenone, 1,1-dichloroacetophenone, 1-hydroxyacetophenone, acetophenone dimethyl ketal, o-methoxybenzophenone, triphenylphosphine, tri-o-tolylphosphine, benz[a]anthracene-7,12-dione, 2,2-diethoxyacetophenone, benzil ketals, such as benzil dimethyl ketal, 2-methyl-1-[4-(methylthio)phenyl]-2-morpholinopropan-1-one, anthraquinones such as 2-methylanthraquinone, 2-ethylanthraquinone, 2-tert-butylanthraquinone, 1-chloroanthraquinone, 2-amylanthraquinone and butane-2,3-dione.

Also suitable are nonyellowing or low-yellowing photoinitiators of the phenylglyoxalic ester type, as described in DE-A 198 26 712, DE-A 199 13 353 or WO 98/33761.

Preference among these photoinitiators is given to 2,4,6-trimethylbenzoyldiphenylphosphine oxide, ethyl 2,4,6-trimethylbenzoylphenylphosphinate, bis(2,4,6-trimethylbenzoyl)phenylphosphine oxide, benzophenone, 1-benzoylcyclohexan-1-ol, 2-hydroxy-2,2-dimethylacetophenone, and 2,2-dimethoxy-2-phenylacetophenone.

The coating compositions comprise the photoinitiators preferably in an amount of 0.05% to 10% by weight, particularly preferably 0.1% to 8% by weight, especially 0.2% to 5% by weight, based on the total amount of the urethane (meth)acrylate (A).

It is additionally possible to add one or more thermally activatable initiators, for example potassium peroxodisulfate, dibenzoyl peroxide, cyclohexanone peroxide, di- tert-butyl peroxide, azobisisobutyronitrile, cyclohexylsulfonyl acetyl peroxide, diisopropyl percarbonate, tert-butyl peroctoate or benzopinacol, and, for example, those thermally activatable initiators which have a half-life of more than 100 hours at 80° C., such as di-t-butyl peroxide, cumene hydroperoxide, dicumyl peroxide, t-butyl perbenzoate, silylated pinacols, which are available commercially, for example, under the trade name ADDID 600 from Wacker, or hydroxyl-containing amine N-oxides, such as 2,2,6,6-tetramethylpiperidine-N-oxyl, 4-hydroxy-2,2,6,6-tetramethylpiperidine-N-oxyl, etc.

Further examples of suitable initiators are described in "Polymer Handbook", 2nd ed., Wiley & Sons, New York.

Suitable thickeners include not only free-radically (co) polymerized (co)polymers but also customary organic and inorganic thickeners such as hydroxymethylcellulose, hydrophobically modified polyurethane or bentonite.

Chelating agents which can be used include, for example, ethylenediamineacetic acid and salts thereof and also β-diketones.

Suitable fillers include silicates, for example silicates obtainable by hydrolysis of silicon tetrachloride, such as Aerosil® from Degussa, siliceous earth, talc, aluminum silicates, magnesium silicates, and calcium carbonates, etc.

Suitable stabilizers include typical UV absorbers such as oxanilides, triazines and benzotriazole (the latter obtainable as Tinuvin® products from Ciba-Spezialitäatenchemie), and benzophenones. They can be used alone or together with suitable free-radical scavengers, examples being sterically hindered amines such as 2,2,6,6-tetramethylpiperidine, 2,6-di-tert-butylpiperidine or derivatives thereof, for example bis(2,2,6,6-tetramethyl-4-piperidyl) sebacate. Stabilizers are typically used in amounts of 0.1% to 5.0% by weight, based on the solid components present in the preparation. It is an advantage of the present invention that the coating compositions of the viscosity do not necessarily have to comprise a solvent, for example butyl acetate, ethyl acetate, methoxypropyl acetate, toluene, xylene, fluorinated aromatics, aliphatic and aromatic hydrocarbon mixtures.

According to the invention, preference is therefore given to those coating compositions which are essentially free from organic solvents.

The coating of the substrates with the coating compositions of the invention is effected by customary methods which are known to those skilled in the art and involve applying a desired thickness of a coating composition of the invention, or a coating formulation comprising it, to the substrate that is to be coated, and optionally drying it. This operation may be repeated once or more than once if desired. Application to the substrate may be effected in a known way, such as for example by spraying, troweling, knifecoating, brushing, rolling, roller coating, pouring, laminating, in-mold coating or coextruding.

The coating thickness is generally in a range from about 3 to 1000 g/m² and preferably 10 to 200 g/m².

Additionally disclosed is a method for coating substrates which involves adding, optionally, further, typical coatings additives and thermally curable, chemically curable or radiation-curable resins to a coating composition of the invention or to a coating formulation comprising it, applying the composition or formulation to the substrate, optionally drying it, and curing it with electron beams or by UV exposure under an oxygen-containing atmosphere or, preferably, under inert gas, optionally with thermal treatment at temperatures up to the level of the drying temperature, and subsequently at temperatures up to 160° C., preferably between 60 and 160° C., particularly preferably between 100 and 160° C.

The coating agents may be applied one or more times by a very wide variety of spraying methods, such as compressed air, airless or electrostatic spraying methods, using one- or two-component spraying units, or else by injecting, troweling, knifecoating, brushing, rolling, roller coating, pouring, laminating, in-mold coating or coextruding.

The coatings are generally dried and cured under standard temperature conditions, that is to say without the coating being heated. Alternatively, the mixtures of the invention can be used to produce coatings which, following application, are dried and cured at an elevated temperature, for example at 40-250° C., preferably 40-150° C., and in particular at 40 to 100° C. This is limited by the thermal stability of the substrate.

Optionally, when a plurality of layers of the coating agent are applied one on top of another, each coating operation may be followed by drying.

Drying may also be effected, in addition to or instead of the thermal treatment, by means of NIR radiation, with NIR In a further process, curing is effected continuously, by passing the substrate treated with the coating composition at constant speed past a radiation source. For this it is necessary that the cure rate of the coating composition be sufficiently high.

This varied course of curing over time can be exploited particularly when the coating of the article is followed by another processing step in which the film surface comes into direct contact with another article or is worked on mechanically.

Reported ppm and percentages in this specification relate to weight percentages and ppm by weight, unless otherwise specified.

The examples below are intended to illustrate the invention without restricting it to these examples.

Abbreviations/Chemicals

| | |
|---|---|
| Bisomer ® MPEG 350 MA | methoxypolyethylene glycol methacrylate (8x EO) |
| Bisomer ® MPEG 550 MA | methoxypolyethylene glycol methacrylate (12-13x EO) |
| Bisomer ® S 10 W | methoxypolyethylene glycol methacrylate (22-23x EO), 50% aqueous solution |
| DMPP | dimethylphenylphosphane |
| Dowfax ® 2A1 | anionic surfactant based on a $C_{12}$-diphenyloxide disulfonate; 45% aqueous solution |
| ETTMP 1300 | ethoxylated trimethylolpropane trismercaptopropionate |
| EpiRez ® 3510-W-60 | 60% aqueous epoxy resin emulsion based on bisphenol A diglycidyl ether |
| Laromer ® GPTA | propoxylated glycerol triacrylate |
| Laromer ® UA 8949 | 40% aqueous urethane acrylate dispersion |
| Laromer ® UA 9064 | 38% aqueous urethane acrylate dispersion |
| Laromer ® UA 9095 | 38% aqueous urethane acrylate dispersion |
| Lutensol ® TO 82 | nonionic surfactant based on a saturated $iC_{13}$-oxo alcohol having 8 EO units; 20% aqueous solution |
| PETMP | pentaerythritol tetramercaptopropionate |
| Pluriol ® A 10 R | polyethylene glycol allyl ether (10x EO) |
| Sipomer ® β -CEA | beta-carboxyethyl acrylate |
| Sipomer ® PAM 200**⁾ | phosphoric monoester of a polypropylene glycol methacrylate |
| Sipomer ® PAM 4000 | phosphoric monoester of a hydroxyethyl methacrylate |
| TMPMP | trimethylolpropane trismercaptopropionate |
| Waterpoxy ® 1422 | 55% aqueous epoxy resin dispersion |
| Waterpoxy ® 1455 | 56% aqueous epoxy resin dispersion | radiation here referring to electromagnetic radiation in the wavelength range from 760 nm to 2.5 μm, preferably from 900 to 1500 nm.

A possible radiation curing can be accomplished by the action of high-energy radiation, i.e. UV radiation or daylight, preferably light with a wavelength of 250 to 600 nm, or by irradiation with high-energy electrons (electron beams; 150 to 300 keV). Examples of radiation sources used include high-pressure mercury vapor lamps, lasers, pulsed lamps (flash light), halogen lamps or excimer lamps. The radiation dose normally sufficient for crosslinking in the case of UV curing is in the range from 80 to 3000 $mJ/cm^2$. Preference is given to low-pressure mercury lamps, medium-pressure mercury lamps with high-pressure lamps, which may optionally have been doped with gallium or iron, and additionally to LED lamps.

Irradiation can optionally also be carried out in the absence of oxygen, for example under an inert gas atmosphere. Suitable inert gases are preferably nitrogen, noble gases, carbon dioxide, or combustion gases. In addition, irradiation can be effected by covering the coating composition with transparent media. Transparent media are, for example, plastics films, glass or liquids, e.g. water. Particular preference is given to irradiation in the manner as described in DE-A1 199 57 900.

EXAMPLES

1) Synthesis of Water-Emulsifiable Thiols (B)

General Procedure A-1:

30.0 g of TMPMP (76.4 mmol) and the respective amounts of modifier are weighed into a 100 ml three-neck flask and mixed by stirring at room temperature. After addition of 0.09 μl of DMPP (0.76 mmol, corresponding to 1.0 mol % based on TMPMP), the reaction mixture is heated to 40° C. and allowed to react for 2 hours up to a conversion of ≥95%. Conversion is monitored by $^1H$ NMR spectroscopy in $CDCl_3$ or $d_6$-acetone as solvent.

| | a) nonionic modification | |
|---|---|---|
| | | Modifier |
| Mod. polythiol | Type | Amount |
| TMPMP-1a | Bisomer ® MPEG 350 MA | 3.29 g (=10 mol %) |
| TMPMP-1b | Bisomer ® MPEG 350 MA | 4.93 g (=15 mol %) |
| TMPMP-1c | Bisomer ® MPEG 350 MA | 6.57 g (=20 mol %) |
| TMPMP-2a | Bisomer ® MPEG 550 MA | 4.80 g (=10 mol %) |
| TMPMP-2b | Bisomer ® MPEG 550 MA | 7.20 g (=15 mol %) |
| TMPMP-2c | Bisomer ® MPEG 550 MA | 9.60 g (=20 mol %) |

-continued a) nonionic modification

| | Modifier | |
|---|---|---|
| Mod. polythiol | Type | Amount |
| TMPMP-3a | Bisomer ® S 10 W | 16.5 g (=10 mol %) |
| TMPMP-3c | Bisomer ® S 10 W | 33.0 g (=20 mol %) |
| TMPMP-4a | Pluriol ® A 10 R*) | 3.80 g (=10 mol %) |

*)Due to the low reactivity of the allyl ether, the reaction mixture had to be heated at 60° C. for 8 hours or at 80° C. for 4.5 hours to achieve sufficient conversion.

b) anionic modification

| | Modifier | |
|---|---|---|
| Mod. polythiol | Type | Amount |
| TMPMP-5a | Acrylic acid | 0.55 g (=10 mol %) |
| TMPMP-6a | Methacrylic acid | 0.66 g (=10 mol %) |
| TMPMP-7a | Sipomer ® β -CEA | 1.10 g (=10 mol %) |
| TMPMP-8a | Sipomer ® PAM 200**) | 3.71 g (=10 mol %) |
| TMPMP-9a | Sipomer ® PAM 4000 | 1.61 g (=10 mol %) |
| TMPMP-10***) | Methacrylic acid + | 0.66 g (=10 mol %) |
| | lauryl methacrylate | 1.94 g (=10 mol %) |

**)Conversion was only around 80%.
***)For the preparation of TMPMP-10, 3.75 g of PETMP (=10 mol %) were allowed to pre-react with the modifiers mentioned and then 26.3 g of TMPMP were added thereto.

2) Testing of Self-Emulsifying Action

General Procedure A-2:

The modified TMPMP is mixed with water in a weight ratio of 1:2 and emulsified using an Ultra-Turrax T25; energy was input for 10 seconds at 11 000 revolutions per minute. As a standard initial weight, 3.0 g of modified TMPMP and 6.0 g of demineralized water are weighed into a glass beaker (50 ml) in order to produce the oil-to-water phase ratio described above. For experiments in which the modifier is already present in the form of an aqueous solution, correspondingly less demineralized water needs to be weighed in. In the case of anionically modified polythiols (TMPMP-5a to -10), small amounts of base (sodium hydroxide solution or ammonia) were added to the water in order to deprotonate the acid groups of the modified polythiol; the pH of the aqueous phase is adjusted to the range 8-9. Following the production of the O/W emulsion, a visual check of the sample is conducted at regular intervals for the purpose of monitoring the stability.

Comparative Experiment C-1:

The procedure is as described in A-2, with the difference that pure, unmodified TMPMP is used instead of the hydro-philically modified TMPMP.

Comparative Experiment C-2:

The procedure is as described in A-2, with the difference that pure, unmodified TMPMP is used instead of the hydro-philically modified TMPMP. As external emulsifiers, use is made of a mixture of 0.027 g of Dowfax® 2A1 (0.4% by weight based on TMPMP) and 0.090 g of Lutensol® TO 82 (0.6% by weight based on TMPMP).

TABLE X

| Stability of various O/W emulsions based on (modified) TMPMP | |
|---|---|
| Polythiol | Emulsion stability |
| C-1 | breaks within a few minutes |
| C-2 | breaks within a few minutes |
| TMPMP-1a | phase separation after 2 hours |
| TMPMP-1b | phase separation after 3½ hours |
| TMPMP-1c | phase separation after 4½ hours |
| TMPMP-2a | phase separation after 5 hours |
| TMPMP-2b | phase separation after 3 hours |
| TMPMP-2c | phase separation after 3 hours |
| TMPMP-3a | phase separation after 3½ hours |
| TMPMP-3c | phase separation after 2½ hours |
| TMPMP-4a | phase separation after 3½ hours |
| TMPMP-5a | phase separation after 1-2 hours |
| TMPMP-6a | phase separation after 1-2 hours |
| TMPMP-7a | phase separation after 1-2 hours |
| TMPMP-8a | phase separation after 1-2 hours |
| TMPMP-9a | phase separation after 1-2 hours |
| TMPMP-10 | phase separation after 1-2 hours |

⇨ O/W emulsions with unmodified TMPMP are not stable even as a result of adding external emulsifiers. Only the use of hydrophilically modified, "self-dispersing" TMPMP results in sufficiently stable O/W emulsions.

3) Compatibility with Water-Dispersible Polymer Mixture (A)

To the water-dispersible polymer mixtures (A) listed in the table were added equimolar amounts of thiol (B) (O/W emulsion or aqueous solution) and the stability of the blends was tested. The aim of this was to achieve a processing time of 2 hours without visible changes.

TABLE Y

| Formulation stability with respect to various reactive resin emulsions | | | | |
|---|---|---|---|---|
| | C-1 | C-2 | TMPMP-2a | ETTMP 1300 |
| Laromer ® GPTA*) | — | gels within a few minutes + evolution of heat | stable | — |
| Laromer ® UA 8949 | phase separation after 5 min | — | stable | — |
| Laromer ® UA 9064 | — | — | stable | gels within 2 h**) |
| Laromer ® UA 9095 | phase separation after 5 min | — | stable | — |

TABLE Y-continued

| | | | | ETTMP |
|---|---|---|---|---|
| | C-1 | C-2 | TMPMP-2a | 1300 |
| EpiRez ® 3510-W-60 | coagulate | — | stable | — |
| Waterpoxy ® 1422 | coagulate | — | stable | — |
| Waterpoxy ® 1455 | coagulate | — | stable | — |

Formulation stability with respect to various reactive resin emulsions

*)as a 30% aqueous emulsion, stabilized with external emulsifiers (0.4% Dowfax ® 2A1 + 0.6% Lutensol ® TO 82)
**)comparative example 1 from WO 2013/139602

⇨ Only blends with the TMPMP emulsions according to the invention are stable. Instabilities are observed for non-hydrophilically modified TMPMP (C-1 and C-2) or water-soluble TMPMP (ETTMP 1330).

4) Performance Testing in Formulation with Aqueous Urethane Acrylate Dispersions For investigation of the mechanical-technological properties of such crosslinked polymer films, formulations are produced from the resin and hardener components and are then applied to glass plates as thin films for the determination of the pendulum hardness or are poured out as thick-layer films for determination of the crosslinking density. To this end, the modified Thiocure® TMPMP is emulsified according to the conditions described above and blended with the respective C=C-functional resin component while stirring with an Ultra-Turrax (10 seconds at 11 000 revolutions per minute). Application to the glass plate was effected using the undiluted sample with a wet film thickness of 200 µm. For measurement of the crosslinking action, the blend is diluted to a solids content of 20% by addition of demineralized water, poured into a round mold (inner Ø approx. 6.9 cm) and dried at room temperature for 7 days.

For comparison purposes, the two radiation-curable urethane acrylate dispersions were also UV-cured; to this end, 2% by weight of Irgacure® 500 as photoinitiator were added to each of them and the resulting polymer films were crosslinked by the action of UV light (total exposure 752 mJ/cm$^2$, peak radiation intensity 1.39 W/cm$^2$).

The pendulum hardness was determined in accordance with DIN standard 53 157 after a drying time of 6 days at room temperature and an additional day at 60° C., the measurement result is given here as the number of pendulum strokes.

The crosslinking density was determined indirectly via the mass lost by the sample after solvent storage as follows: A piece of polymer film measuring about 2×2 cm and approx. 0.6 mm thick is weighed beforehand (=initial mass $m_0$) and, placed in 60 ml of methyl ethyl ketone, stored in a 100 ml flask for 24 hours with gentle shaking. The remaining material is then filtered off on a 45 µm filter, re-dried in a drying cabinet at 40° C. for one day and weighed again (=gel content $m_T$). The percentage gel content of the crosslinked sample is calculated according to $(m_0 - m_T)/m_0 \times 100\%$.

As can be seen from the results summarized in tables Z1 and Z2, the use of the polythiol emulsions according to the invention leads to significant crosslinking of the polymer films based on urethane acrylate dispersions which is of a level comparable to the prior art (=SH-PUD) or to radiation curing. In contrast, such polymer films are less hard and thus more flexible/more elastic, which is manifested in markedly reduced pendulum hardnesses.

TABLE Z1

| | C-1 | Ex. 1A | Ex. 1B | Ex. 2A | Ex. 2B | Ex. 3A | Ex. 3B | C-2a | C-2b | C-3 |
|---|---|---|---|---|---|---|---|---|---|---|
| Crosslinker | without | TMPMP-1b | | TMPMP-2b | | TMPMP-3a | | SH-PUD**) | | UV light |
| Amount*) | — | 21.0 | 28.0 | 21.0 | 28.0 | 21.0 | 28.0 | 39.0 | 52.0 | — |
| Pendulum hardness | 40 | 57 | 53 | 56 | 53 | 44 | 51 | 101 | 107 | 86 |
| Gel content | 0% | 35% | 76% | 58% | 71% | 52% | 58% | 62% | 81% | 79% |

Performance properties of selected formulations based on Laromer ® 8949

*)In % by weight solid/solid based on the C=C-functional binder
**)Example 2 from WO 2013/139602

TABLE Z2

| | C-4 | Ex. 4A | Ex. 4B | Ex. 5A | Ex. 5B | Ex. 6A | Ex. 6B | C-5a | C-5b | C-6 |
|---|---|---|---|---|---|---|---|---|---|---|
| Crosslinker | without | TMPMP-1b | | TMPMP-2b | | TMPMP-3a | | SH-PUD**) | | UV light |
| Amount*) | — | 27.8 | 37.0 | 27.8 | 37.0 | 27.8 | 37.0 | 51.5 | 68.7 | — |
| Pendulum hardness | 15 | 34 | 17 | 23 | 18 | 22 | 12 | 99 | 104 | 98 |
| Gel content | 0% | 87% | 94% | 93% | 91% | 91% | 88% | 91% | 94% | 88% |

Performance properties of selected formulations based on Laromer ® 9095

*)In % by weight solid/solid based on the C=C-functional binder
**)Example 2 from WO 2013/139602

The invention claimed is:

1. A two-component coating composition comprising
at least one water-dispersible polymer mixture (A) which has at least one
mercapto-reactive group selected from the group of epoxide and Michael acceptor,
and also
at least one water-emulsifiable thiol (B) comprising, as formation components,
(Ba) at least one compound having at least two mercapto groups,
(Bb) at least one compound having at least one mercapto-reactive group and at least one dispersing group,
wherein the formation component (Ba) has a Hansch parameter of at least 2.0.

2. The two-component coating composition according to claim 1, wherein the mercapto-reactive group in the water-dispersible polymer mixture (A) is an itaconate, methylenemalonate, maleimide, fumarate, maleate, glycidyl, acrylate, acrylamide, crotonate, cinnamate, methacrylamide and/or methacrylate group.

3. The two-component coating composition according to claim 1, wherein the polymer mixture (A) comprises a polyurethane acrylate, a polyester acrylate, a polyether acrylate, an epoxy acrylate, a multifunctional acrylate monomer or a glycidyl ether-functional epoxy resin.

4. The two-component coating composition according to claim 1, wherein the polymer mixture (A) comprises a polyurethane comprising, as formation components,
(Aa) at least one organic aliphatic, aromatic or cycloaliphatic di-or polyisocyanate,
(Ab) at least one compound having at least one isocyanate-reactive group and at least one itaconate, methylenemalonate, maleimide, fumarate, maleate, acrylate, acrylamide, crotonate, cinnamate, methacrylamide and/or methacrylate group,
(Ac) optionally at least one compound having at least two isocyanate-reactive groups,
(Ae) optionally at least one compound having exactly one isocyanate-reactive group,
(Ag) at least one compound having at least one isocyanate-reactive group and at least one dispersing group.

5. The two-component coating composition according to claim 1, wherein component (Ba) is esters of polyhydric alcohols with mercaptopropionic acid.

6. The two-component coating composition according to claim 1, wherein component (Ba) is trimethylolpropane trismercaptopropionate (TMPMP), pentaerythritol tetramercaptopropionate (PETMP), polycaprolactone tetramercaptopropionate (PCL4MP1350) or dipentaerythritol hexamercaptopropionate (DIPETMP).

7. The two-component coating composition according to claim 1, wherein component (Bb) comprises a polyalkylene ether group as dispersing group.

8. The two-component coating composition according to a claim 1, wherein component (Bb) comprises a polyethylene ether group as dispersing group.

9. The two-component coating composition according to claim 8, wherein the polyethylene ether group has a molecular weight Mn of from 200 g/mol to 2200 g/mol.

10. The two-component coating composition according to claim 1, wherein component (Bb) comprises anionic groups or groups that can be converted into anionic groups as dispersing groups.

11. The two-component coating composition according to claim 10, wherein the anionic groups or groups that can be converted into anionic groups are phosph(on)ate, sulf(on)ate and/or carboxylate groups.

12. A process for preparing aqueous dispersions according to claim 1, wherein the polymer mixture (A) and thiol (B) are prepared separately from one another and then mixed with each other.

13. The use of a two-component coating composition according to a claim 1 in coatings and paints.

14. The use of a two-component coating composition according to claim 1 for coating substrates.

15. The use of a two-component coating composition according to claim 1 for coating parts of buildings, coatings on vehicles and aircraft, and industrial applications, railways, utility vehicles in agriculture and construction, what is known as ACE (agricultural construction and earthmoving equipment), wind turbines, bridges, buildings, power masts, tanks, containers, pipelines, power stations, chemical plants, ships, cranes, halls, roofs, furniture, windows, doors, wood flooring, cardboard, for floor coverings, such as in parking levels or in hospitals, automotive paints as refinish applications, and refinish, plastics and industrial applications.

* * * * *